United States Patent Office 2,738,429
Patented Mar. 13, 1956

2,738,429
INDICATOR FOR HIGH ENERGY RADIATION STERILIZING PROCESSES

Samuel A. Goldblith, Melrose, Mass.

No Drawing. Application August 2, 1952,
Serial No. 302,425

8 Claims. (Cl. 250—83)

The present invention relates to sterilization by high energy radiation and, in particular, to an indicator therefor and to a method for indicating exposure to such radiation. The increased importance of the use of high energy radiation both in the field of medicine and in the sterilization of food products or other consumer goods, has made it increasingly desirable to provide simple and reliable means for indicating whether or not the materials exposed to high energy radiations have been properly exposed. For commercial application, a simple indicator is required to assure that all exposed materials can be readily recognized by an inspector as having been subjected to the desired irradiation. While this problem superficially appears somewhat similar to detectors for ultraviolet radiation, there is a fundamental difference. In photochemistry, that is in reactions which are brought about by visible and ultraviolet light, the reactions are caused by specific wave lengths of the radiation which are connected with a particular group or bond within the materials acted on by the light. In the case of high energy radiation such as radiations having an energy of one hundred thousand electron volts or higher, such as X-rays, alpha, beta, and gamma rays, high energy electron beams, etc., the effect of the radiation is practically independent of the chemical structure of the substances exposed and is rather dependent on the mass of the absorbing material, the absorption occurring throughout its mass. In general, such high energy irradiations bring about excitation of the exposed molecules and cause ionization. Thus, in the case of water, hydroxyl radicals and hydrogen atoms are formed ultimately, with the intermediate formation of various other products. Accordingly, in the case of systems containing water generally oxidation and reduction processes can occur; however, some side reactions can be caused by unstable ions, activated molecules, or free radicals. In the past, a number of indicators for such high energy irradiations have been suggested. In particular, aqueous solutions of methylene blue or methylene blue solutions in agar gels and resazurine in agar gels may be mentioned. While such systems have been found of value and practical for research investigations, they do not lend themselves readily for commercial and other practical applications. Indicator systems of the type mentioned undergo a change from their colored state to uncolored compounds on irradiation with high energy radiation. Furthermore, they are not readily useful for the marking of commercial articles, as in particular of packaged materials. A number of other approaches, such as ionization chambers or chemical changes which then have to be evaluated by specific chemical reactions in a separate step, while useful for research purposes, need not be considered in this connection.

An object of this invention is to provide a high energy irradiation indicator for sterilization processes or other high energy treatments which will undergo a decided color change and, on proper exposure, will leave a readily recognizable colored mark. Another object of this invention is the development of printing inks incorporating such indicator materials. Still another object is to provide methods for using such indicators in the treatment and inspection of materials to be irradiated or for dosimetric measurements of the amount of radiation received by them. Further objects will become apparent in the following specification.

The present invention is based on the discovery that tetrazolium salts will undergo striking color changes when subjected to high energy irradiation in the presence of water. Tetrazolium compounds for the purpose of the present invention may be described as organic compounds containing one or more heterocyclic nitrogen rings with four nitrogens and one hydrocarbon group, one of the nitrogens being in the pentavalent stage. Characteristically such substances on reduction will change to colored formazan type compounds. The class of compounds thus described is shown in a schematic structural formula wherein R is a hydrocarbon group or hydrogen and X an acid radical. Several groups of this type may be linked together directly or by intervening groups.

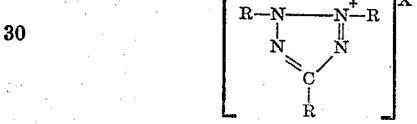

Typical representatives of this type of compound are the 2,3,5 triphenyl-tetrazolium-chloride and the 3,3' dianisol-bis 4,4'(3,5 biphenol)-tetrazolium chloride. The structural formulas of which are as follows:

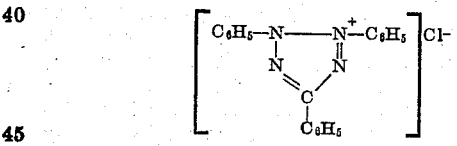

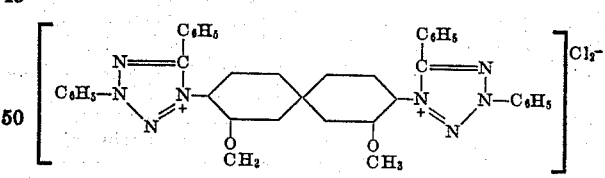

While the reactions occurring on high energy irradiation are not fully understood, it is believed that, on being subjected to such radiations a compound present, such as water, is excited and decomposed to form hydroxyl radicals and hydrogen atoms. By the action of the hydrogen atom on tetrazolium compounds they are reduced to form dyes of the formazan type, according to the following schematic reaction (the symbols having the same meaning as above):

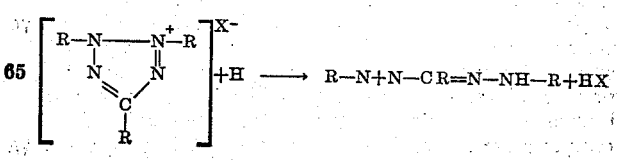

or, in the case of the dianisol-bis-diphenyl-tetrazolium-chloride:

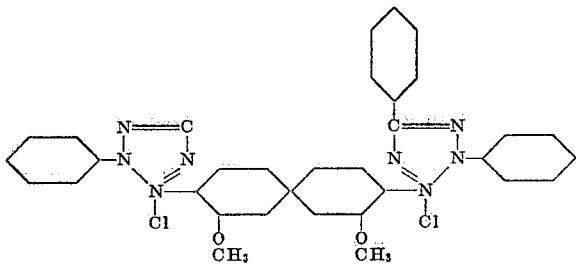 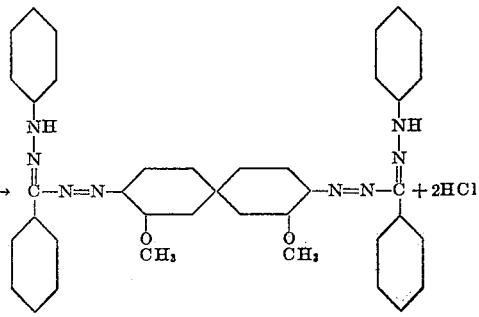

Whether this precise reaction takes place or not, I have established in many experiments that, when subjected to sufficient amounts of high energy radiation, such tetrazolium salts form highly colored substances, while they in themselves are usually colorless or faintly colored substances. Thus, the tri-phenol-tetrazolium chloride gives a pink to carmine color, while the dianisol-bis-diphenol-tetrazolium-chloride leads eventually to a deep blue. In practical applications of such tetrazolium salts, they can be used either in aqueous solution or more preferably in solid compositions containing moisture in sufficient amounts to support the reaction indicated above. The compositions have apparently sufficient water retention or hygroscopicity to retain sufficient amounts of water from the time of application to the materials to be exposed to the actual exposure thereof. The theoretical ratio of water to tetrazolium salt is given by the possible yield of hydrogen per molecule of water. Accordingly, one molecule of water is necessary for each tetrazolium nucleus for theoretical full conversion of the salt. In practice this ratio is not critically adhered to. Frequently an excess of tetrazolium salt will be desirable to assure reaction of all hydrogen liberated although an excess of water may be employed to assure full conversion of the tetrazolium salts. In all cases an amount of tetrazolium per unit area exposed will be selected to assure a readily noticeable color change on exposure. Thus, for thin paint or paint type applications, 0.1% by weight of a tetrazolium salt will cause readily noticeable color changes. When used in solution, the amount will depend on the depth of liquid column absorbed. In typical small ampules, considerably less than 100 mg. per 100 cc. will bring about desired color changes and as little as 10 mg. will be readily discernible. In any case, the most desirable concentrations and ratios of water to tetrazolium salt can be determined by simple and straightforward experiments to obtain optimum results for any given applications. Thus, the amount of water and of the indicator tetrazolium salt should be sufficient to give a readily recognizable color change on proper exposure; however, only a minor or no color change if the exposure should have been insufficient. Generally speaking, higher concentrations of the tetrazolium salts will raise the threshold of perceptible color change and vice versa.

The sensitivity of the color reaction can be greatly increased if the exposure is carried out in the presence of aromatic, at least slightly water-soluble, substances capable of reacting with the hydroxyl radicals, thus effectively tying them up so that they cannot react with the formazan type compounds formed by irradiation. Particularly suitable are benzene and mono-substituted benzene derivatives such as benzoic acid, and benzoates, as well as nitrobenzene, which, on irradiation with high energy radiation in the presence of water are converted to phenol or phenolic compounds. For the purposes of the present invention, it is irrelevant whether the phenol or phenolic compounds are formed only as intermediates or as final reaction products. While benzoic acid and benzoates are preferred, many other hydroxyl radical acceptors are shown in the literature and, if compatible with the tetrazolium salts and soluble in sufficient amounts in water (only minute solubility being necessary), can be used satisfactorily for the present purposes. While the reactions involved are not fully understood, it is believed that the increased sensitivity of the color reaction of the indicators according to this invention is due to the fact that the reaction of the hydroxyl radicals with the said acceptors prevents or minimizes possible back reactions or reversible reactions in the conversion of the tetrazolium salts to formazan-type dyes.

For many applications, the indicators according to this invention can be used in straight aqueous solution and be retained in glass or plastic containers such as glass or plastic vials. For many practical applications, such as especially for packaged consumer goods, it has been found to be preferable to incorporate the indicator materials in printing ink formulations containing constituents capable of retaining a sufficient amount of water or being sufficiently hygroscopic to retain sufficient amounts of water to bring about the desired reaction. In preparing such printing inks, it has been found that it is best to follow customary procedures and to incorporate the tetrazolium salts in the same way as pigments on an ink mil and to add the water-retaining or hygroscopic substances to the mix and thereby introducing the necessary amounts of moisture. Such indicator inks then can be applied by conventional printing processes to the packages and after exposure will produce a visible and attractive mark indicating proper exposure. While this method of applying the indicator is preferred, other simple methods are well within the limits of this invention. Thus, the indicator materials can be incorporated in a solution which can be transferred to the material or packages to be marked by simple roller dippers or other simple devices. Typical examples of marking compositions and ink formulations as well as preferred compositions will be given in the examples hereafter.

While the indicators according to this invention usually and most simply can be used as inspection means to indicate and differentiate between exposure and lack of exposure, they have been found suitable also as dosimeters where such should be necessary. By careful calibration and adjustment of the composition for any desired type of high energy radiation, the total absorbed by the indicator, and thus absorbed by the material to be irradiated, can be evaluated by well-known colorimetric means, since the change from colorless or faintly colored tetrazolium salts to the colored formazan type dyes occurs gradually and largely proportional to the energy absorbed.

The possible fields of application for the indicators according to this invention are many fold both for scientific and commercial processes. They are, however, particularly useful for industrial applications where inspection of materials which have been irradiated by high energy radiation is to be carried out by non-technical personnel. Thus, they are particularly useful in the field of sterilization by high energy radiation of foods, drugs, organic tissues, etc. Specifically, one could mention the sterilization of soil-grown crops such as wheat, oats, rye, barley, corn, tea, coffee, tobacco, and many more. According to the type of material treated and to the end-use of the type of materials, identification can be effected on the wrapper of the package or by means of markers which are included within or on the material.

Possible sources of high energy radiation for such sterilization processes, or other processes, can be both natural or artificial; for example, electron accelerators, such as the Van de Graaff electron accelerator or the betatron, can be mentioned. As to artificial radioactive isotopes, $Co^{60}$ and other artificial radioactive isotopes can be used. Of course, natural radioactive substances will also be useful.

In general, the present invention will be useful for high energy radiations corresponding to one hundred thousand electron volts and up, but particularly for sterilization processes which are mostly carried out at higher levels of energy corresponding to one or more million electron volts, such as produced by linear (Van de Graaff, etc.) or curved (betatron, etc.) accelerators. (One electron volt is equivalent to $1.60 \times 10^{-12}$ ergs or $3.82 \times 10^{-20}$ gram calories. It is expressed as the quantum energy imparted to an electron, therefore, being an indication of its velocity and, accordingly, penetration.) However, the indicators will still be useful for much higher radiation levels.

For producing sterilizing or bactericidal effects, the destruction of living tissue, or other effects connected with high energy radiation, the amount of radiation received and adsorbed by the materials subjected thereto is of paramount importance. The amount of energy is then most conveniently expressed in roentgen (r) or roentgen equivalent physical (rep) units. The roentgen is defined as that amount of X-ray or gamma ray radiation producing under standard conditions (0° C., 760 mm. pressure), in one cubic centimeter of air, one electrostatic unit of charge, of either sign. Accordingly, one r is equivalent to $5.23 \times 10^7$ million electron volts per gram of air (83.8 ergs per gram air); therefore $1 \times 10^6$ roentgen units is equivalent to 8.3 joules/gram air under standard conditions. The rep applies to other types of radiations such as beta rays, protons, alpha rays, neutrons, etc. (The rep is defined as the quantity of ionizing radiation which will produce $1.6 \times 10^{12}$ ion pairs/gram tissue or 83 ergs of heat energy per gram of tissue.) As usually used, and as used herein, one rep is equivalent to the energy (amount) in one gram of tissue as derived by secondary standards and not determined for each material separately.

In practice the dose in reps for any given high energy radiation fields can be most conveniently measured by the use of aqueous methylene blue solution. I found it most convenient to use the following concentrations for the following ranges:

| Microgram/milliliter | rep |
|---|---|
| 10 | 1,000 to 10,000 |
| 100 | 10,000 to 300,000 |
| 500 | 200,000 to 1,000,000 |
| 1,000 | 500,000 to 5,000,000 |

The aqueous methylene blue solutions are placed into 5 ml. chemical glassware ampules and subjected to the high energy radiation under various dose conditions, and the color retention measured with a colorimeter. The percent color retention is then plotted versus the dose on an arbitrary scale (in terms of relative power output or time of constant power output). From the point of the curve corresponding to 63% color retention, the rep are arrived at as follows:

$$\frac{Do}{C} = 2.80 \times 10^9 \text{ rep/gm./ml.}$$

(accuracy about ±5%) where Do is the inactivation dose and C the concentration of methylene blue.

Thus, for example, if the concentration of the solution used for finding the 63% color retention point was $1 \times 10^{-3}$ gm./ml., the dosage in the location and for the time of exposure was equal to $$Do = 2.75 \times 10^9 \times 10^{-3} = 2.75 \times 10^6 \text{ rep.}$$

The relationships may be further illustrated by applying them to the use of a particle accelerator for various amounts of energy. A Van de Graaff generator operated at 3 million electron volts and 4 milliamperes, running at 50% efficiency will produce 6000 watts (6000 joules/second). For a dose requirement (as determined by experiment) of $2 \times 10^6$ rep (16.6 joules/gm.) the above accelerator will handle 6000 joules/second divided by 16.6 joules/gm. that is 361 grams per second. The dose requirements for various ionizing radiation uses are approximately as follows:

Pasteurization _____ 1000 to 50,000 rep.
Sterilization _____ 50,000 to 2,000,000 rep.
Destruction of viruses and
  enzymes _____ 1,000,000 rep and up.

The dosage (in rep) necessary to sterilize or otherwise treat any given material is determined by experiment and then expressed in reps by a secondary standard related as described above. The choice of energy level of radiation on the other hand is determined by the energy of absorption (relative ionization level) in the material to be treated as is well known in the art. Just by way of example, it may be mentioned that for the detection of 30,000 reps, 100 milligrams per 100 cubic centimeters water of the dianisol-bis-diphenyl-tetrazolium-chloride will be sufficient. The sharpness of this reaction, in view of the above discussion, will be increased in the presence of about one gram of sodium benzoate. Since the indicators integrate the energy absorbed, it is irrelevant whether the total energy is applied over short or longer periods of time.

In carrying out the method according to the present invention, the indicator, whether in the form of a solution or a printed or prepared tag or otherwise, is introduced into the irradiation chamber or irradiation space simultaneously with the materials to be exposed, both for batch type and for continuous processes. In continuous processes, the indicator will be associated with the materials processed in such a manner that it is present both at the beginning and the end of the continued process, and regularly spaced throughout so as to give a continued check of proper operation. Where the process is used in connection with packages, each package may be tagged with an indicator composition and, where such processes are continuous, it will preferably be marked in a continuous stripe extending the full length of the package in the direction of passage. Thus, in the case of tea, wheat products, tobacco products, bandages, etc., each package may be marked with a stripe of indicator parallel through the chamber, so that the package after exposure will have a visible mark which can be readily inspected before shipping of the material.

The present invention may be illustrated by the following examples without, however, being limited thereto:

*Example I*

A solution of triphenyl-tetrazolium-chloride containing 100 mg. per 100 cc. water was prepared. The solution was introduced into a glass vial and subjected to high energy radiation in a Van de Graaff electron accelerator generating about 2 m. e. v. The filled vial was subjected to an energy of approximately $3 \times 10^6$ rep. After exposure, the colorless solution turned into a cherry red. While the substance has been found highly satisfactory for the purposes of this invention, it is somewhat sensitive to visible radiation, and for proper usage, is to be protected from exposure to sunlight or strong visible radiation.

Example II

In a similar manner, a solution of 100 mg. dianisol-bis-diphenyl-tetrazolium-chloride was prepared and subjected to the same test. The solution turned from a light yellow to a purple or to a burgundy color when exposed to the high energy radiation in a vial from which air was carefully evacuated. The sensitivity of this material to visible light and especially to visible artificial light is markedly lacking compared to the one shown in Example I. Thus, an hour of exposure at 4″ distance from a 60 watt light bulb with a reflector did not cause any perceptible color change on a strip of paper saturated with the above solution.

Example III

A solution of the dianisol-bis-diphenyl-tetrazolium-chloride was prepared as in Example II; however, 1% based on the water of sodium benzoate was added. Under the same conditions of irradiation by a Van de Graaff electron accelerator as in Example II, a deep blue color was obtained indicating more complete reduction in the blue formazan compound.

Example IV

Satisfactory compositions for producing the color change were prepared in a series using 100 milligram solutions of the dianisol-bis-diphenyl-tetra-zolium-chloride in 100 cc. of water with one gram of sodium benzoate added when thickened with any of the following: methyl cellulose, carboxy methyl cellulose, hydroxy ethyl cellulose, polyvinyl alcohol, and sodium polyacrylate. While all these compositions showed good color changes, they did not develop satisfactory printing properties for stamp pad inks. They were, however, satisfactory for application by brush or other markings by hand. The addition of glycol or similar materials for water retention was found to be advantageous. The amounts of these materials were adjusted to give the desired viscosity to the liquid but, otherwise, were not critical.

Example V

The following composition was prepared by grinding the material on an ink mill (three roll mill):

| | Parts by weight |
|---|---|
| Yellow dextrin | 10 |
| Gum arabic | 35 |
| Glycerin | 20 |
| Water | 35 |
| Santocel C (high surface soft silica gel by Monsanto Chemical Company) | 4 |
| Sodium benzoate | 2 |
| Dianisol-bis-diphenyl-tetrazolium-chloride | 0.25 |

This composition produced an excellent, nearly colorless typographic printing ink which, however, also could be used for stamp pads. Printing marks made with this ink produced well-defined colored marks when subjected to high energy ionizing radiation. The good color definition, at least in part, is due to the fact that the tetrazolium compound in the form of a dry powder could be introduced in higher concentrations than was possible by the introduction in the form of a solution and thus, on irradiation, well-defined color marks were obtained.

Example VI

The following composition was likewise prepared by grinding on an ink mill:

| | Parts by weight |
|---|---|
| Cold water soluble polyvinyl alcohol | 30 |
| Glycerin | 10 |
| Water | 70 |
| Sodium benzoate | 2 |
| Dianisol-bis-diphenyl-tetrazolium-chloride | 0.5 |

This composition was found to be excellently suited to application by a roller type applicator as well as by brush or by hand operation. Marks made with this composition produced well-defined colored marks when exposed to high energy ionizing radiation.

Example VII

Typical packaging cartons were marked with a printing ink as given in Example V on the forward end and on the aft end as well as with a stripe along the long axis applied by the roller-type applicator with indicators as shown in Example VI. The cartons thus marked were then introduced into the radiation chamber of a Van de Graaff electron accelerator, and subjected to $3 \times 10^6$ rep. After exposure, the stamped-on marks as well as the roller-type applicated stripe appeared in well-defined outline, fully colored in a gentian blue color.

While some typical and preferred tetrazolium salts are shown herein, various other tetrazolium salts can be used equally as well. By way of example, the following may be named: 2,5 diphenyl, 3-(p-iodo-tetrazolium-chloride); 2,3 di-(p-iodophenyl)-tetrazolium-chloride; 2-(p-iodophenyl)-3-(p-nitrophenyl)-5 phenyl-tetrazolium-chloride. Similarly tetrazolium phosphates or other tetrazolium salts can be used. While, at the present time, not many of the tetrazolium salts have been synthesized, it will readily apparent that the class of compounds may be employed as indicators for ionization radiation.

Having now described my invention, I claim:

1. A package adapted to be passed through a field of high energy radiation and containing material to be sterilized by said radiation, and a marking on the outside of said package made of a radiation-indicator marking ink comprising an intimate mixture of a tetrazolium salt, an ink vehicle, a thickener, a benzoate, and a hydrophilic material retaining water, which upon subjection to high energy radiation in excess of 100,000 electron volts in amounts above 10,000 rep is converted to a distinctly colored product by the formation of a formazan-type dye by the action of the high energy ionization products of water, each nucleus of said dye resulting from the reaction of one tetrazolium nucleus with one decomposed molecule of water.

2. A package adapted to be passed through a field of high energy radiation and containing material to be sterilized by said radiation, and a marking on the outside of said package and running lengthwise of said package in the direction of passage of said package through said field, said marking being made of a radiation-indicator marking ink comprising an intimate mixture of 3,3′ dianisol-bis 4,4′ (3,5-diphenyl)-tetrazolium-chloride, an ink vehicle, a thickener, a benzoate, and a hydrophilic material retaining water, which upon subjection to high energy radiation in excess of 100,000 electron volts in amounts above 10,000 rep is converted to a distinctly colored product by the formation of a formazan-type dye by the action of the high energy ionization products of water, each nucleus of said dye resulting from the reaction of one tetrazolium nucleus with one decomposed molecule of water.

3. A method of sterilizing by means of high energy ionizing radiation which comprises subjecting material to be sterilized and an indicator associated therewith to high energy ionizing radiation, said indicator comprising a tetrazolium salt, water and a hydroxyl radical acceptor, said indicator being one which upon subjection to high energy radiation in excess of 100,000 electron volts in amounts above 10,000 rep is converted to a distinctly colored product by the formation of a formazan-type dye by reaction of the high energy ionization products of water, each nucleus of said dye resulting from the reaction of one tetrazolium nucleus with one decomposed molecule of water, and continuing said radiation of both said material to be sterilized and said indicator simultaneously and for the same length of time, until said indicator is converted to a distinctly colored product.

4. A method of sterilizing by means of high energy ionizing radiation which comprises subjecting material to be sterilized and an indicator associated therewith to high energy ionizing radiation, said indicator comprising a tetrazolium salt, water, and a mono-substituted benzene derivative, said indicator being one which upon subjection to high energy radiation in excess of 100,000 electron volts, in amounts above 10,000 rep, is converted to a distinctly colored product by the formation of a formazan-type dye by the action of the high energy ionization products of water, each nucleus of said dye resulting from the reaction of one tetrazolium nucleus with one decomposed molecule of water, and continuing said radiation of both said material to be sterilized and said indicator simultaneously and for the same length of time, until said indicator is converted to a distinctly colored product.

5. A method of sterilizing by means of high energy ionizing radiation which comprises subjecting material to be sterilized and an indicator associated therewith to high energy ionizing radiation, said indicator comprising water and 3,3'-dianisol-bis 4,4'(3,5-diphenyl)-tetrazolium-chloride, which upon subjection to high energy radiation in excess of 100,000 electron volts, in amounts above 10,000 rep, is converted to a distinctly colored product by the formation of a formazan-type dye by the action of the high energy ionization products of water, each nucleus of said dye resulting from reaction of one tetrazolium nucleus with one decomposed molecule of water, and continuing said radiation of both said material to be sterilized and said indicator simultaneously and for the same length of time, until said indicator is converted to a distinctly colored product.

6. A method of sterilizing by means of high energy ionizing radiation which comprises subjecting material to be sterilized and an indicator associated therewith to high energy ionizing radiation, said indicator comprising water and 2,3,5-triphenyl-tetrazolium-chloride, which upon subjection to high energy radiation in excess of 100,000 electron volts, in amounts above 10,000 rep, is converted to a distinctly colored product by the formation of a formazan-type dye by the action of the high energy ionization products of water, each nucleus of said dye resulting from the reaction of one tetrazolium nucleus with one decomposed molecule of water, and continuing said radiation of both said material to be sterilized and said indicator simultaneously and for the same length of time, until said indicator is converted to a distinctly colored product.

7. A method of sterilizing and treating packaged materials with high energy ionizing radiation, which comprises the steps of applying to the package an imprint with an indicator composition being an intimately interground mixture of a tetrazolium salt, an ink vehicle, a thickener, and a hydrophilic material and moisture, said imprint comprising a continuous stripe extending throughout the full length of the package in the direction of the passage of the package through said field, introducing said marked package into an ionizing radiation field and subjecting it while passing it lengthwise through said field, to high energy ionizing radiation of more than 100,000 electron volts in amounts above 10,000 rep, subsequently withdrawing said marked package from the radiation field and subjecting it to means for color comparison.

8. A method of sterilizing and treating packaged materials with high energy ionizing radiation, which comprises the steps of applying to the package an imprint with an indicator composition containing an intimately interground mixture of 3,3'-dianisol-bis 4,4'(3,5-diphenyl)-tetrazolium-chloride, an ink vehicle, a thickener, a hydrophilic material, moisture, and a benzoate, said imprint comprising a continuous stripe extending throughout the full length of the package in the direction of the passage of the package through said field, introducing said marked package into a high energy ionizing radiation field, and subjecting it while passing it lengthwise through said field to high energy ionizing radiation of more than 100,000 electron volts in amounts above 10,000 rep, and subsequently withdrawing said package from said field.

References Cited in the file of this patent

UNITED STATES PATENTS

| | | |
|---|---|---|
| 2,347,644 | Sell | May 2, 1944 |
| 2,429,217 | Brasch | Oct. 21, 1947 |
| 2,602,751 | Robinson | July 8, 1952 |

OTHER REFERENCES

"Chemical Dosimetry of Ionizing Radiations," Day et al., Nucleonics, February 1951, pp. 34–45.

"A Colorimetric Dosimeter etc.," Taplin et al., Radiology, vol. 56, April 1951, pp. 577–91.

"Radiation Effects on 2, 3, 5-Triphenyltetrazolium Chloride Solutions," Gierlach et al., American Journal of Roentgenology, October 1949, pp. 559–563.